United States Patent [19]

Och

[11] Patent Number: 5,016,471

[45] Date of Patent: May 21, 1991

[54] TEST METHOD AND TESTING DEVICE FOR DETECTING ANY FAULTS, OR INACCURACIES, IN SPLINED WHEELS OR OBJECTS WITH SIMILAR PROFILES

[75] Inventor: Rudolf Och, Nürnberg, Fed. Rep. of Germany

[73] Assignee: Firma Frenco Verzahnungslehren GmbH, Altdorf, Fed. Rep. of Germany

[21] Appl. No.: 414,752

[22] Filed: Sep. 29, 1989

[30] Foreign Application Priority Data

Oct. 6, 1988 [DE] Fed. Rep. of Germany ... 8812569[U]
Feb. 4, 1989 [DE] Fed. Rep. of Germany ....... 3903333

[51] Int. Cl.[5] ........................................... G01M 13/02
[52] U.S. Cl. .................................. 73/162; 33/501.13; 33/501.19
[58] Field of Search .............. 73/162; 33/501.7, 501.8, 33/501.13, 501.19, 706, 707, 794

[56] References Cited

U.S. PATENT DOCUMENTS

| | | | |
|---|---|---|---|
| 2,726,455 | 12/1955 | Saari | 33/501.19 |
| 2,741,034 | 4/1956 | Donaghey et al. | 33/501.19 |
| 2,780,006 | 2/1957 | Flair | 33/501.19 |
| 2,815,581 | 12/1957 | Strelow et al. | 33/501.19 |
| 3,031,765 | 5/1962 | Müller | 33/501.13 |
| 3,181,247 | 5/1965 | McMahan et al. | 33/501.19 |
| 3,992,937 | 11/1976 | Jaeger et al. | 73/162 |
| 4,037,325 | 7/1977 | Weber et al. | 33/707 |
| 4,519,242 | 5/1985 | Höfler et al. | 73/162 |
| 4,790,074 | 12/1988 | Warr et al. | 33/501.8 X |
| 4,793,067 | 12/1988 | Reimar et al. | 33/707 |

FOREIGN PATENT DOCUMENTS

744222 6/1980 U.S.S.R. ........................... 33/501.19

Primary Examiner—William A. Cuchlinski, Jr.
Assistant Examiner—Scott Cummings
Attorney, Agent, or Firm—Toren, McGeady & Associates

[57] ABSTRACT

A method for detecting faults, or inaccuracies in a test object which is a splined wheel having teeth of substantially similar shape, or in an object having a similarly shaped toothed profile, including rolling the test object against a counter splined wheel of a testing device with similarly formed teeth, which testing device includes a plurality of gauging elements which are introducible into the spaces between the two teeth of the test object, each gauging element having a curved testing cross-section engageable in the spaces between the test object teeth, the radius of the testing cross-section of the gauging elements is selected relative to the structure and shape of the teeth of the test object so that the testing cross-section rests on the test object tooth flanks at points between the top and the base of the tooth, alternately only one of the testing cross-sections, then two of the testing cross-sections, then again only one of the testing cross-sections and so as, is introduced in the spaces between the test object teeth or teeth of a master reference object, the differences between the insertion depths when only one of the testing cross-sections is inserted and when two of the testing cross-sections are inserted, are measured and recorded by determining a corresponding change in the distance (a) between the axes of rotation of the counter splined wheel and test object, the above mentioned procedure being performed continuously due to rotation of a roller wheel, or a corresponding testing device, which includes a number of testing cross-sections.

19 Claims, 9 Drawing Sheets

TEST METHOD AND TESTING DEVICE FOR DETECTING ANY FAULTS, OR INACCURACIES, IN SPLINED WHEELS OR OBJECTS WITH SIMILAR PROFILES

BACKGROUND OF THE INVENTION

The invention relates firstly to a test method for splined wheels. Splined wheels are used for the push-in connection of structural elements, e.g. a shaft provided with a splined wheel and a hollow hub which comprises a corresponding inner set of teeth, into which the teeth of the splined wheel can be pushed. As a result of this, the opposing sets of teeth are connected during rotational movement. However, splined wheels do not allow rolling movement relative to one another, as is possible with rolling gears. The same applies to other similarly shaped profiles, such as for example the so-called top-bevel of gear wheels or the thread of a screw or the like.

Splined wheels must be examined for various faults, or inaccuracies, such as for example that they rotate correctly and there are no defects in concentricity. This can, of course, be performed simply with rolling gears by causing the object to be examined (hereinafter called a test object) to rotate with a standard rolling gear wheel which is manufactured to an exact shape, especially with regard to concentricity, and measuring any deviation from running true results with the gear to be examined. Because this method cannot be used for splined wheels, for the above mentioned reasons, until now the examination has been made, in the case of splined wheels, by inserting a gauging device in the form of a measuring ball or a measuring roller in a gap between the teeth of the test object. The test object is rotated so that the gaps between the teeth are measured in succession, and each distance of the gauging device from the axis of rotation of the test object is measured. This is extremely expensive and time consuming. The same applies to a similar method in which a number of rollers are used as the gauging device, the rollers being arranged in a chain at a distance from one another which corresponds to the spacing of the teeth in the splined wheel. Consequently the rollers lie next to one another in the gaps between the teeth. The expense of manufacturing the rollers and connecting them by means of a chain, and in addition of measuring the individual distances from the axis (see above), is very great in this case too.

SUMMARY OF THE INVENTION

The object of the invention is to provide methods which are substantially simpler than those currently available and in particular are easier to perform, i.e. less operator effort is required to obtain the results.

With this method, by means of rotating the roller wheel or of the revolving device (in the following for the sake of brevity referred to only as "roller wheel"), variations in the distance of the rotation shaft of the roller wheel from the rotation shaft of the object to be examined or the master reference object can be continuously and very rapidly measured and displayed. The method can also be used for, and the advantages also apply to the so-called "dimensions (or test measurements) by means of two rollers" procedure. By the term "master" is meant a standard example which has the exact specified dimensions of the splined wheel in question, which is produced by very precise processing, e.g. grinding,—usually by a toolmaker. When the test object is rotated by means of the roller wheel or the like, a curve of the actual condition of the test object can be obtained. When the master is measured with the roller wheel, a specification or calibration curve can be obtained for use with the method. The respective test objects will differ more or less in their measurements from the specified values and, if applicable, from the dimensions of a master. As a result of performing the method with the combination of roller wheel and test object, the above-mentioned differences, i.e. faults, can be detected and compared with the appropriate specifications, or optionally the specification or calibration curve of a master. Because, for this purpose, only one complete rotation (360°) of the object to be examined is required (provided the test object comprises teeth or teeth-like parts in a circle), and this can be performed continuously and the results are recorded automatically, the operator effort involved is very small. Semi-skilled assistants can also be employed since their work is substantially limited to changing the test objects. The same applies in a general way in the case of a test object with teeth or teeth-like parts in a straight line behind one another, such as a screw.

When the invention is used only to detect variations in the distances between the axes during a rotation or a displacement, i.e. faults in running true or in linearity, no master is necessary. In contrast, a master is necessary to determine the "dimensions by means of two rollers" already mentioned above. This method should detect faults, or inaccuracies, in the thickness of the teeth, for example the teeth of a toothed connecting wheel. For this purpose, the previous method has been to insert a roller into each of two diametrically, or substantially diametrically, opposite gaps between the teeth and to measure the distance between these rollers. Depending on the thickness of the teeth, the gap between two teeth is shorter or longer, which allows a lesser or greater depth of penetration of the appropriate rollers. In this way the average thickness of the teeth can be measured by means of the "dimensions by means of two rollers". In this connection the instructions of DIN 3960 are specifically referred to. The previously customary procedure consisted of inserting one or two balls or rollers and measuring their separation, removing the balls or rollers, rotating the object to be examined by one gap and then repeating the above-mentioned process. This is very troublesome and time consuming and above all requires well trained and consequently expensive workers.

The invention is not limited to measurement of the two above-mentioned faults. It an also be used to detect other faults such as, for example, faults with the aforementioned top bevels on splined wheels and can be used for corresponding measurements on threads (see above). In these cases the axis of the roller wheel is at an angle to the axis of the test object, whereas during measurement of the previously described defects in concentricity and in the "dimensions by means of two rollers" of splined wheels the axis of the roller wheel is parallel to axis of the test object.

The above-mentioned procedures for measuring the distance between the axes and the "dimensions by means of two rollers" can advantageously be performed together, i.e. in one operation, wherein both possible faults can be seen and evaluated from one and the same recording.

A procedure is provided which enables the measurement of a further, frequently occurring source of errors which as rule have to be measured, namely faults or inequalities in the spacing of the teeth of a toothed wheel or objects which have similarly shaped profiles, such as for example the above-mentioned top bevels, and threads of a screw or the like.

A procedure is provided which advantageously combines the recording of the distance between the axes and dimensions by means of two rollers with that made of the faults or inequalities in the spacing of the teeth in a common record. This considerably facilitates rapid detection and evaluation of any defects which are present. As mentioned, measurements of other faults can also be incorporated in such a common record. Another object of the invention is to provide a testing device which is considerably easier and cheaper to manufacture than is possible with state of the art methods, and which can be used for one or more of the above-mentioned process claims of the invention.

This objective is achieved because the gauging elements required in order to perform the tests are fastened together in a circle to form a common, rotatable device (roller wheel). The difference between the shape of the testing cross-sections and teeth of the test object makes it possible to rotate the roller wheel and the test object in opposite directions to one another or to move them in translation, however, in contrast to rolling gears, the respective contact surfaces of the testing cross-section and the tooth of the test object do not roll on one another but slide over one another. The shape of the testing heads also makes possible an alteration in the distance between the axes depending on whether one testing head is inserted in one gap between the teeth, or two adjacent testing heads are inserted in two adjacent gaps between the teeth, as well as the measurement and recording resulting from this. The above-mentioned rotatability of the roller wheel enables the simple and rapid detection of faults in splined wheels, or in top bevels in gear wheels, screw threads or similar profiled objects, which prevent rolling on a counter-object with teeth of the same shape. These faults have been mentioned before. They will be described in more detail in the following. With the present device it is possible to detect rapidly and easily, in the case of the rotating test object such as a toothed connecting wheel, after it has been rotated through a complete 360° rotation with the simultaneous corresponding co-rotation of the device which carries the testing cross-sections (the roller wheel) whether a fault is present and, if so, to what extent and how large it is. This is a very decisive advantage, particularly in the case of mass production. From US-PS 2,780,007 a device is disclosed for testing for faults in tooth alignment and of their angle of slope, which device comprises teeth which are substantially T-shaped in cross-section fastened on a wheel, and the teeth are intended to engage in the gaps between the teeth of a splined wheel to be tested. The objective of US-PS 2,780,007, or the problem it attempts to solve, thus differs from that of the present invention.

Another object of the invention is to ensure that there is sufficient space between the individual gauging elements of the testing device so that the tops of the teeth of the test object do not strike on the bottom of the gaps between the gauging elements. It is also an object of the invention to include a simple means for measuring the variations in distance between the axis of rotation of the test object and the axis of rotation of the testing device, which measure the "dimensions by means of two rollers" or any faults in concentricity.

Another object of the invention if to provide, in an advantageous manner a connection between the bearings of the shafts and the roller wheel and the test object, or the master, and mention a device which can make an appropriate measurement.

Both the last two mentioned measuring devices can be coupled to a single apparatus or be connected together. This is an advantage both with regard to the production cost and to the ease of using the apparatus. In particular, this arrangement enables both measurements to be displayed on the same record.

DETAILED DESCRIPTION OF THE PREFERRED EMBODIMENTS

To show the basic principles of the invention more clearly, the drawings in FIGS. 1 to 5 concentrate on showing a test object 1 which comprises a push-in toothing 2. Push-in toothings differ from rolling toothings in that they cannot roll over one another by means of the flanks of their teeth. This is not possible for several reasons, e.g. when their angle of engagement $\alpha$ is too large (in the embodiment example shown here this angle is about 45°). On these or on other grounds related to the shape of the teeth of the splined wheel, it cannot roll over a splined wheel with teeth of the same shape.

The gauging elements of the testing device each consist of a curved testing cross-section 6, in the case of this embodiment example having the shape of a section of a circle, which is delimited by the section of a circle 6 and the chain-dotted line 7. The radius r of this testing cross-section is chosen so that with the deepest penetration of the testing cross-section in the spaces 8 between two teeth 2, the contact points 9 or 9' of the periphery 6 of the testing cross-section on the flanks 3 of the teeth are substantially in the middle region between the top of the tooth 10 and the bottom of the tooth 11.

Figure 1:
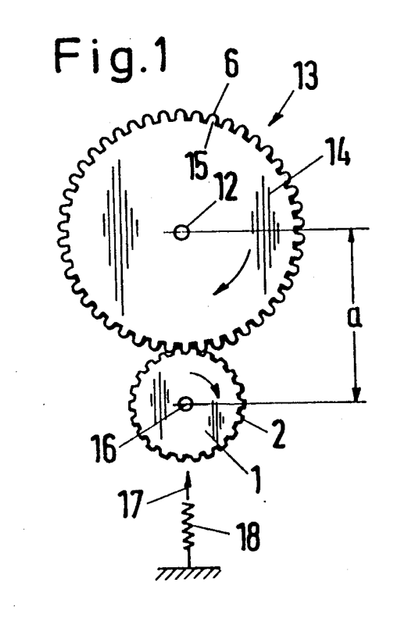
FIGS. 1 to 3 show a test object, or a master, and a testing device in three different angular positions of the objects which rotate in opposite directions.
Figure 2:
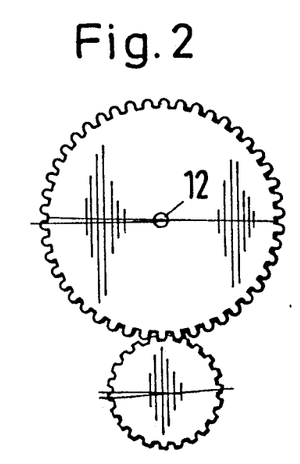
Figure 3:
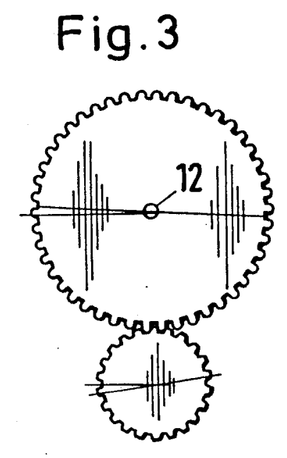
Figure 4:
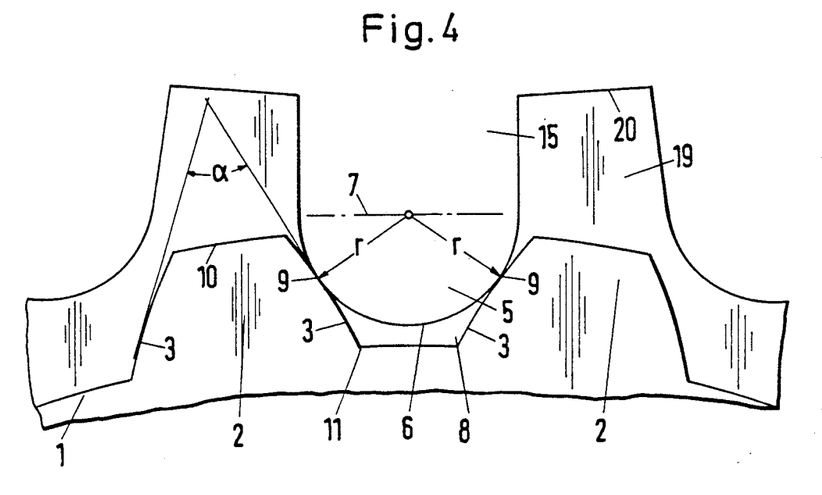
FIG. 4 shows the engagement between the test object, or a master, and the testing device as shown in FIG. 1, on a larger scale that the latter.
Figure 5:
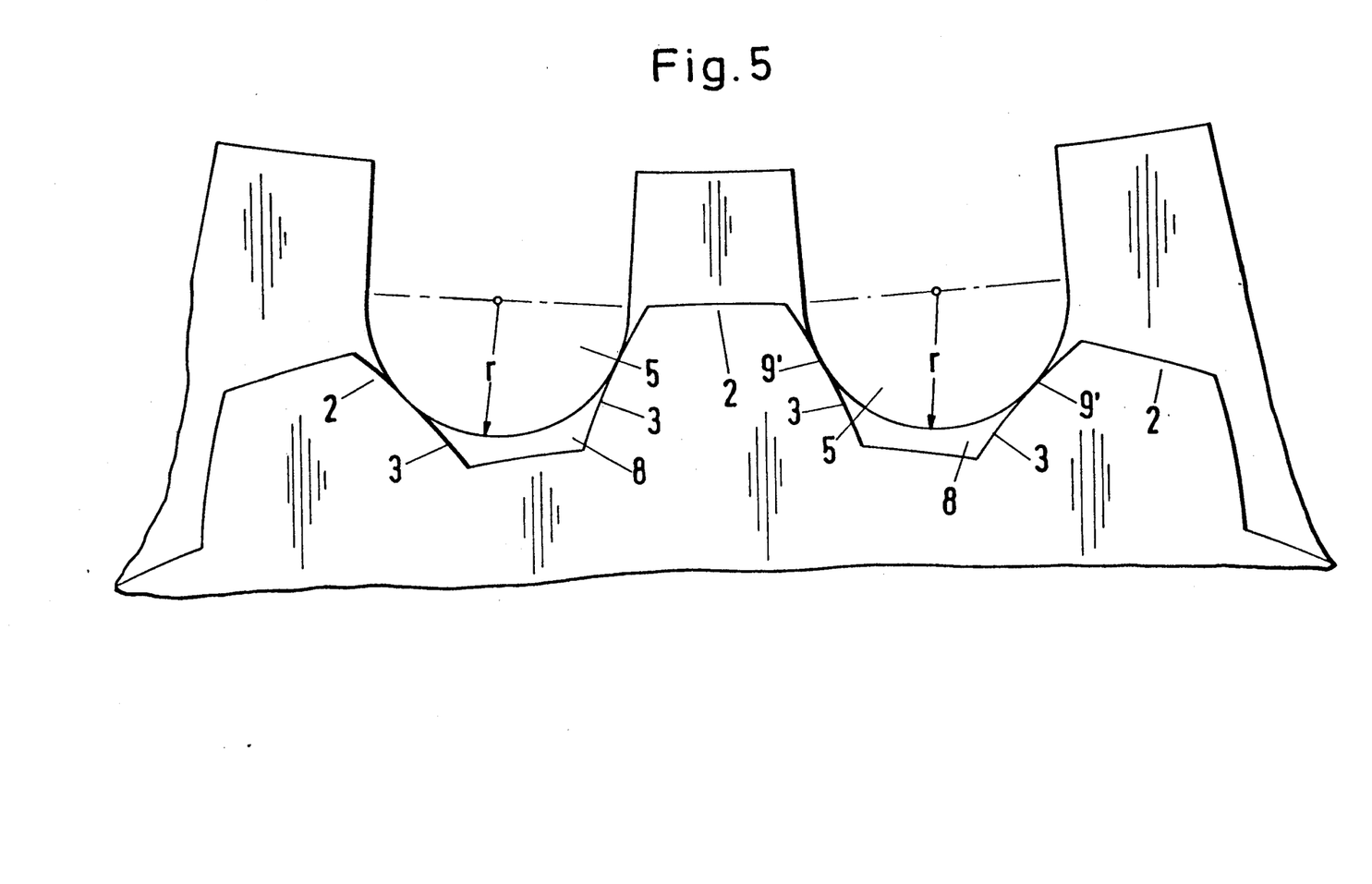
FIG. 5 shows the engagement between the test object, or a master, and the testing device as shown in FIG. 3, on a larger scale.

All the gauging elements are arranged together in a circle and possess in the circumferential direction a separation or spacing which corresponds with the separation or spacing of the teeth 2 of the test object or of the master. Consequently, as FIGS. 1 to 3 show, the testing cross-sections 5 are directed radially outwards from the mid-point or the mid-axis 12 of the testing device 13 in question. In the preferred shape of this embodiment, which is particularly simple, the testing device 13 consists of a roller wheel 14 with projections 1 extending radially outwards which terminate in the already described testing cross-section 5. The roller wheel 14 and the parts 15, 5 are preferably one piece with one another. There is enough space or "air" 19 between the projections 15 together with the testing cross-sections 5 so that the tops of the teeth 2 cannot collide with the flanks of the projections 15 and the base parts 20 which are situated between the projections.

The test object or the master 1 and the testing device 13 can be rotated in the directions shown by the arrows about their mid-axes 12 and 16. Changes in the distance a between these axes indicate any variations in the trueness of rotation of the object to be examined 1. For this to occur, on of the axes 16 or 12 can be displaced in the direction of the arrow, whilst the test object or master and the testing device are pressed together by the pressure of a spring 18. From the variations in the distance, results can also be obtained for the above mentioned "dimensions by means of two rollers" method. This will explained in more detail later with reference to FIGS. 7 to 9.

FIG. 1 shows the starting position 0°, FIG. 2 a rotation of the test object by 4.091° from the starting position, and FIG. 3 a further rotation of the test object to a total of 8.1818° from the position in FIG. 1. The respective distances a between the axes are given in mm. In the drawings of FIGS. 1, 2 and 3, FIG. 2 shows the transition from the position of the parts 1 and 14 in FIG. 1 to their position in FIG. 3. In the position in FIG. 1, only one testing cross-section 5 engages in the space 8 between two teeth of the test object (see also the enlarged representation in FIG. 4). The distance a between the axes is greatest in this case, namely 54.1511 mm in the embodiment example shown. Because of the shape and size of the testing cross-section, in particular as a result of the choice of the above-mentioned radius r, in the position shown in FIGS. 1 and 4 only one testing head penetrates into a gap bearing the teeth of the test object, or of the master, which produces the above-mentioned distance between the axes a. When the roller wheel and the test object or the master rotate relative to each other through an appropriate angle, they arrive in the position shown in FIGS. 3 and 5 in which two testing cross-sections 5 engage in the spaces 8 between the teeth of the test object or of the master. This too depends on the shape and size of the test object. Whereas in the position shown in FIGS. 1 and 4 the contract points 9 of the periphery 6 of the testing cross-section 5 are situated symmetrically on the flanks 3 of the teeth, i.e. they are at the same distance from the top of the tooth 2, in the position shown in FIGS. 3 and 5, because of the angled position of the testing cross-sections relative to the test object or the master, the contact points 9' are situated somewhat asymmetrically, in other words at unequal distances from the top of the tooth 2. In both the afore-mentioned positions, however, there is a contact of the periphery 6 of the testing cross-section 5 on the flanks 3 of the teeth. As shown in FIG. 3, in the case of the position shown in FIGS. 3 and 5 the distance a between the axes is 53.8713 mm, i.e. smaller than the distance a between the axes when the parts are in the position shown in FIGS. 1 and 4. As a result of these differences in the distance between the axes, curves as shown in FIGS. 9 to 12 are obtained in which the highest peaks correspond with the large distance a between the axes shown in FIGS. 1 and 4, and the troughs in the trace to the small distance a between the axes shown in FIGS. 3 and 5.

During the change from the individual phases of FIG. 1 to FIG. 2, FIG. 2 to FIG. 3, and so on, the periphery 6 of the testing cross-section 5 slides along the respective flank 3 of the tooth in question. Thus there is no substantially non-sliding rolling as occurs with the so-called rolling splined wheels. Because of this sliding of the periphery 6 on the flanks 3 a smaller sinusoidal wave, which will be discussed later, also occurs in the measuring trace.

As already mentioned at the beginning, a master must be used when the "dimensions by means of two rollers" method is used, i.e. when variations or defects in the thickness of the teeth must be detected. On the other hand, faults in concentricity and faults in spacing can also be detected without suing a master, i.e. by measurements made only on the appropriate test object.

Figure 6:
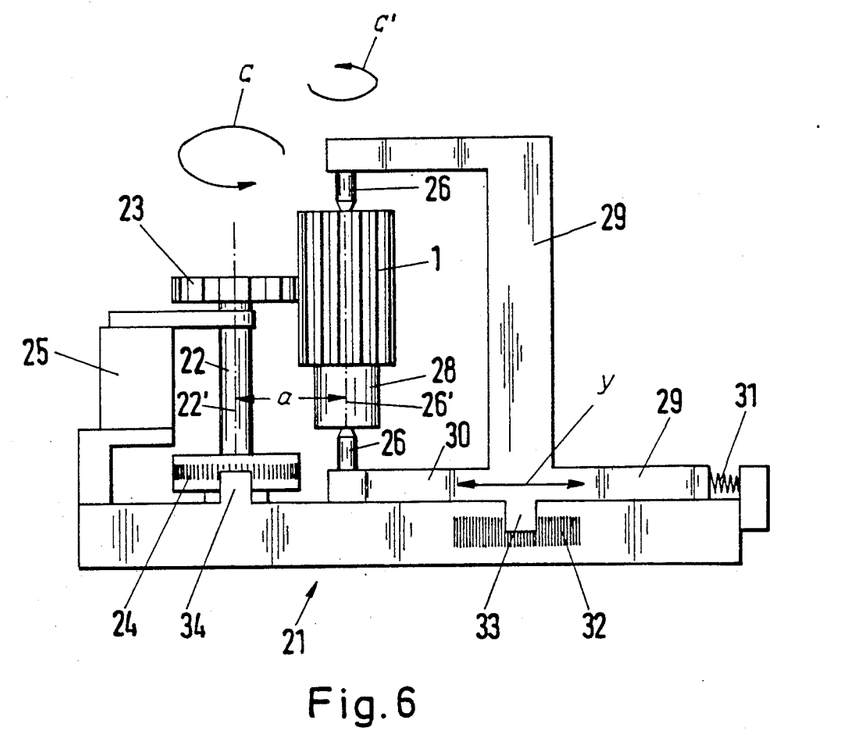
FIGS. 6 through 8 are further possible embodiments of testing devices in accordance with the invention.

FIG. 6 shows in more detail a testing device according to the invention with which both faults in concentricity and the "dimensions by means of two rollers" can be measured and recorded, which testing device also comprises an arrangement for detecting faults, or inaccuracies, in spacing. A shaft 22 is rotatably fastened to a frame of the testing device 21, by a shaft bearing and both a roller wheel 23 and a bar-code rotation indicator 24 are attached to rotate with it. The shaft 22 is driven by a motor 25. The direction of rotation of parts 22 to 24 is shown by the arrow C. In addition, the appropriate test object or the master 1 is rotatably fastened to the frame 21, e.g. by means of an end bearing 26. In this embodiment the rotation shaft 28 of the test object or of the master is parallel to the shaft 22. Its direction of rotation shown by arrow C' is opposite to the direction of rotation C. The distance a between the longitudinal mid-line of the shafts 22 and 28 is measured as follows. A slide 29, which carries the end bearings 26 on two arms 29, 30, can be moved forwards and backwards in the direction of the arrow Y. A spring 31, projecting from the frame, is provided for this purpose, which spring presses the test object or the master 1 against the roller wheel 23. The variations $a_1$ in the distance a between the axes are measured by means of a linear measuring scale 32 of the testing device and a bar-code reader 33 which moves along the linear measuring scale in the direction of the arrow Y according to the displacement of the master of the test object. The possibility of obtaining the above-mentioned relative displacement between the roller wheel, on the one hand, and the master or the test object, on the other hand, can also be provided if the master or the test object is fixed to the testing device 21, whilst the roller wheel, on the other hand, is attached so that it can be displaced longitudinally. In that case the linear measuring scale and the associated bar-code reader must then be situated in a position where the displacement of the roller wheel relative to the frame can be measured.

The measurement traces obtained with the invention are shown in FIGS. 9 to 12.

Figure 11:
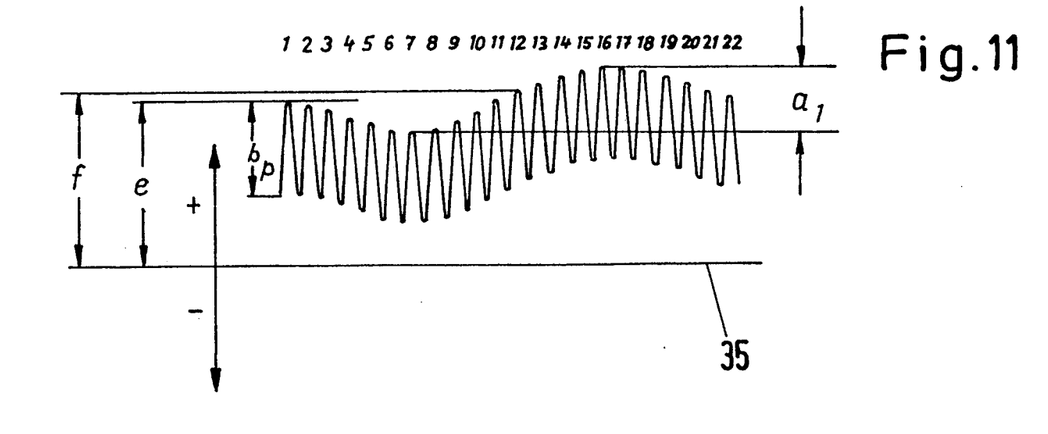
FIG. 11 is a measurement trace, obtained when using the testing device according to the invention, of the rotation of an object to be examined which shows no defects in concentricity defects.
Figure 12:
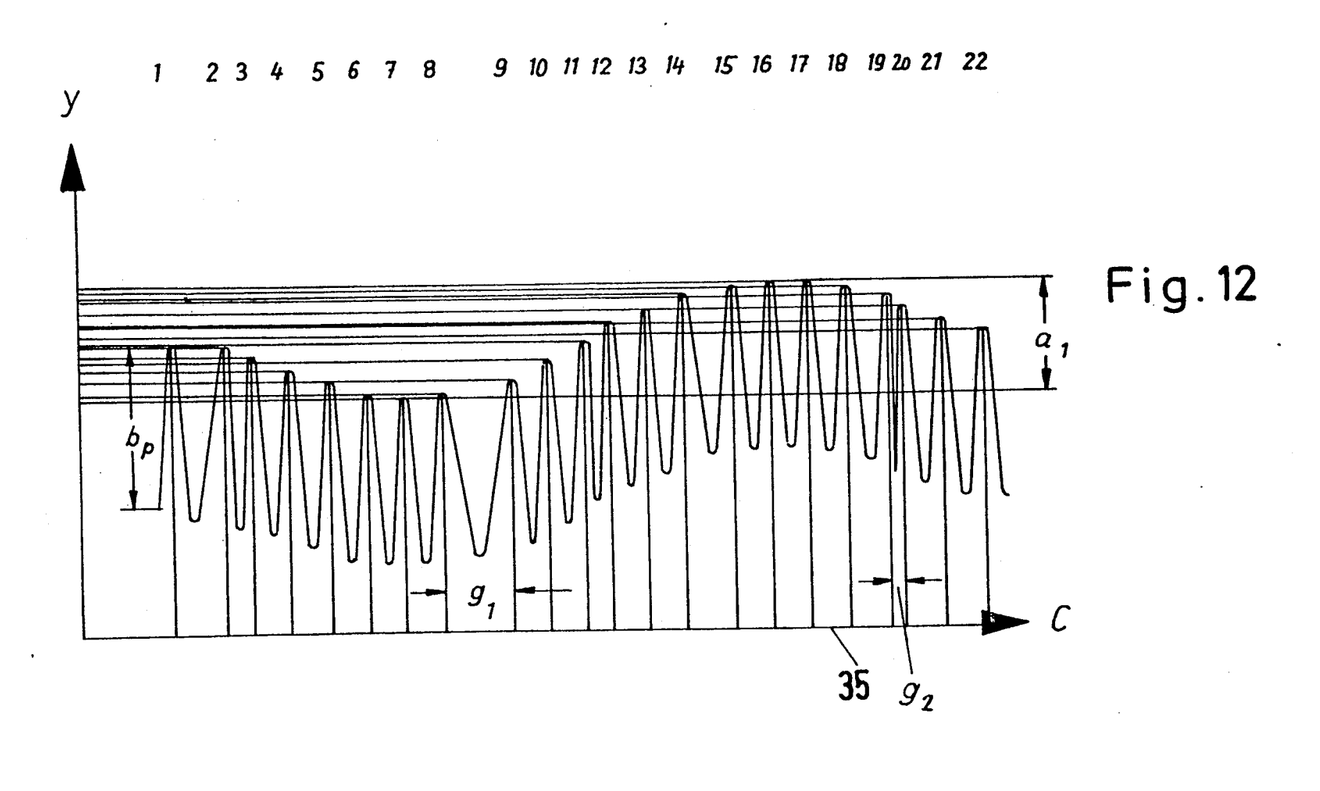
FIG. 12 is a measurement trace as in FIG. 11, but which also incorporates the variation in spacing.

FIG. 11 shows the variation in the distance a which is produced in the case of a test object which has a fault in concentricity, on rotating it through 360°. This trace shows a series of connected small, substantially sine-shape waves, where the distance $b_p$ between successive peaks of the wave shows that on changing from the position in FIGS. 1 and 4 to that in FIGS. 3 and 5, and back again to the position in FIGS. 1 and 4, the testing cross-section 5 penetrates to a greater or lesser depth in the spaces 8 between the teeth. On the other hand, the value $a_1$ is in this case a measure of a concentricity defect which is present, since it comprises the largest variated between peaks in the top half of the trace.

Figure 9:
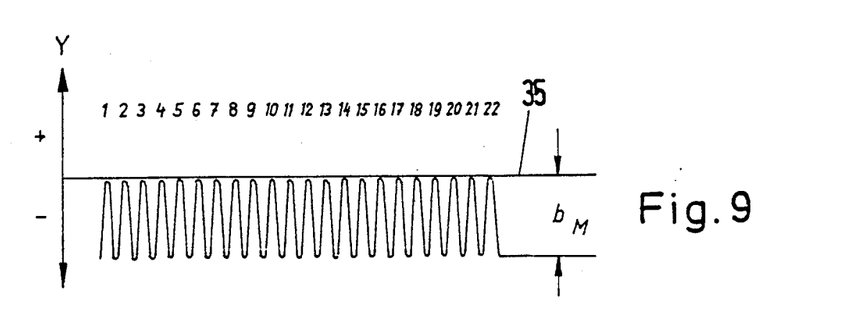
FIG. 9 is a measurement trace, obtained when using the testing device according to the invention, of the rotation of a master through 360°.

FIG. 9 shows the corresponding trace which is obtained with a so-called master. This shows that the concentricity defect measurement "$a_1$" is zero. This zero value is denoted by the so-called "master-reference" 35, which is obtained from the highest peaks of this "master-trace". The diameter of the master does not appear in this trace. In contrast to the amplitude $b_p$ of the test object the amplitude is here referred to as $b_m$.

The size of a concentricity defect $a_1$ of the particular test object can then be calculated, e.g. electronically, in order to process the test object to eliminate this defect. In order to detect concentricity defects it is above all necessary that there are variations in the distance a between the axes in the positions shown in FIG. 1 and FIG. 4.

Figure 10:
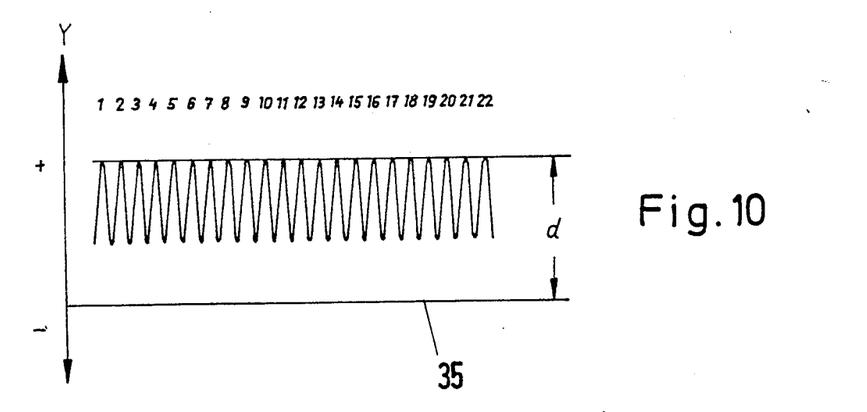
FIG. 10 is a measurement trace, obtained when using the testing device according to the invention, of the rotation of an object to be examined which shows no defects in concentricity in rotation through 360°.

FIG. 10 shows, for the purpose of further explanation, a trace analogous to those in FIGS. 9 and 11 of an ideal test object without any variation in axis separation $a_1$, which trace is shown in a corresponding alignment with a "master"-trace as shown in FIG. 9, of which only the zero line 35 is shown here. The distance d between the maximum values of this test object trace in FIG. 10 and the zero line 35 corresponds to the difference in the distance between the axes obtained with the test object and that obtained with the master, where in this case the diameter of the test object is greater than the diameter of the master. This and the previous explanation always applies, as should be mentioned for the sake of completeness, in the case where a master is required.

Figure 7:
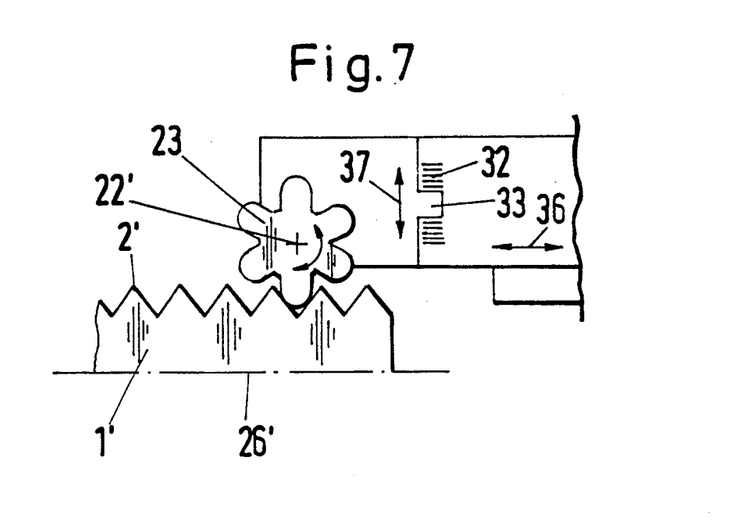
Figure 8:
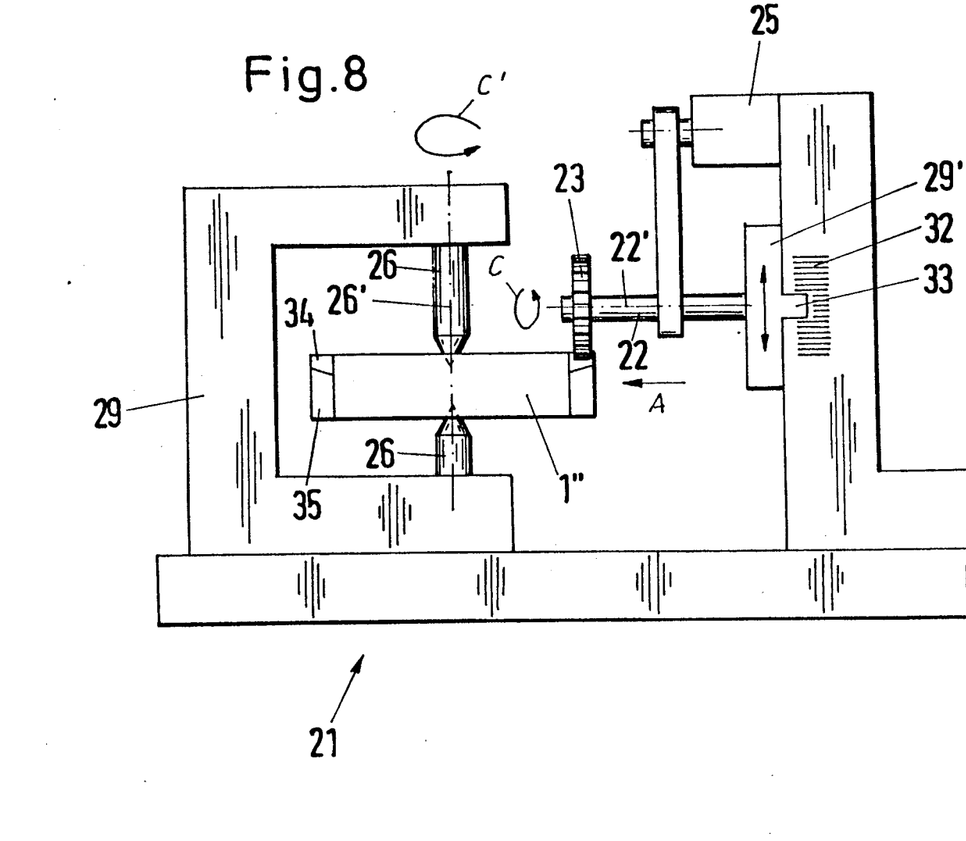

The above-mentioned measuring method and the associated device (in this connection see also the details of the following embodiments with reference to FIGS. 6 to 8) can, as already mentioned, also be used to measure other possible faults, or inaccuracies, in the test object. This will be explained using as an example the "dimensions by means of two rollers" method which likewise has already been mentioned. Starting with an example of a test object 1 with 22 teeth, as shown in FIGS. 1 to 3, on rotation o the test object through 360° traces are obtained as in FIG. 11 in which the positions of the teeth 1 to 22 are marked on the abscissa. These reference numbers also apply to a corresponding "master" trace as in FIG. 10. In the vertical ordinate Y are shown the already discussed variations in the separation distance of the axes from the master zero reference (see reference number 35) and also the amplitude $b_{pp}$ which has been described in detail above. The difference in diameters of the test object and the master can be measured from the values shown as $e+f$ on a pair of diametrically opposite teeth 1 and 12. These values are in each case the differences between the distances from the axis of the respective teeth (here tooth 1 and tooth 12) and the corresponding values for the master. The "dimensions of the test object by means of two rollers" thus consists of the (not shown) diameter of the master measured y means of two rollers plus $e+f$. The divergence of other pairs of teeth (2 and 13, 3 and 14, etc.) of the test object are determined and evaluated. It is obvious that all the measurements "$a_1$", "b", "e" and "f" are derived from the measurement of the changes in the distance between the axes 12 and 16, and consequently can be recorded and also evaluated together, as has already been explained for the measurement "a".

All the above-mentioned measurements are obtained by rotating the test object or master through 360°. This gives the respective abscissas of FIGS. 9 to 12, where changes in the distance between the axes a and also of the above-mentioned dimensions obtained by means of two rollers are shown on the Y ordinate. With regard to determining the "dimensions by means of two rollers" it should be said that if the distance between two teeth is very large, then the separation distance a is less than the zero or standard distance of the master. If, on the other hand, the teeth are thicker than those of the master, the measured separation distance a will be greater than the distance between the longitudinal mid-lines of the master and the shaft 22.

When possible deviations or defects in the distribution of the teeth are to be detected, the bar-code rotational position indicator 24 and the corresponding bar-code reader 34 are used for this purpose. The results are shown along the abscissa C in FIG. 12. If the spacing between the teeth of the test object deviate from this normal spacing, this results in a corresponding displacement along the abscissa C of the "waves" shown in the trace in FIG. 12. Faults in the spacing can be detected and evaluated. In this case a maximum spacing defect $g_1$ is indicated between teeth 8 and 9 and a smallest spacing defect $g_2$ between teeth 19 and 20. Therefore the variation in spacing is $g_1-g_2$. In addition the sizes of $b_p$ and $a_1$ are drawn on the Figure, where $a_1$ is the maximum concentricity difference between tooth 7 and tooth 17. For the sake of clarity the previously described measurements e and f are not shown here, although they can be obtained from this trace just as they can from the trace in FIG. 11. Consequently, with this embodiment of the invention it is possible to obtain all the faults or inaccuracies which have to be measured in this case displayed together in a single trace in a recording as in FIG. 12. In particular it is possible with the combination of measuring and recording, as explained above, to attribute any faults in concentricity and in the "dimensions by means of two rollers" and also in the spacing to the teeth responsible for them. It is not only possible to display and print out all the measurements on a single monitor, but they can be sent to a computer for appropriate evaluation. As shown particularly in FIG. 6, all the measurements can be made with a single apparatus, with which the only manipulation involved, namely changing the test objects, can be performed easily and rapidly.

FIGS. 7 to 8 show, partially only in principle, testing devices for making measurements on objects with similarly shaped profiles. These are in the case of FIGS. 7 and 7a teeth 2' of a threaded bold 1' (test object). The roller wheel 23 is moved in a direction parallel to the longitudinal mid-axis 26' of the test object (see also the double arrow 36). The movement of the roller wheel 23 in the direction shown by the double arrow 37 causes a displacement of the associated bar-code reader 33 relative to the linear measuring scale 32. The double arrow 37 corresponds to the Y axis of the previous embodiment. Any defects in the thickness of the teeth and their so-called straightness (which corresponds to concentricity in the case of push-in toothed wheels) can be measured hereby. A bar-code displaying device, which is not shown here, can also be fastened to the shaft 22' of the roller wheel, with an associated bar-code reader fastened on the testing device, in order to measure defects in the pitch of the thread (this corresponds to defects in the slope in the case of push-in toothed wheels).

Figure 7A:
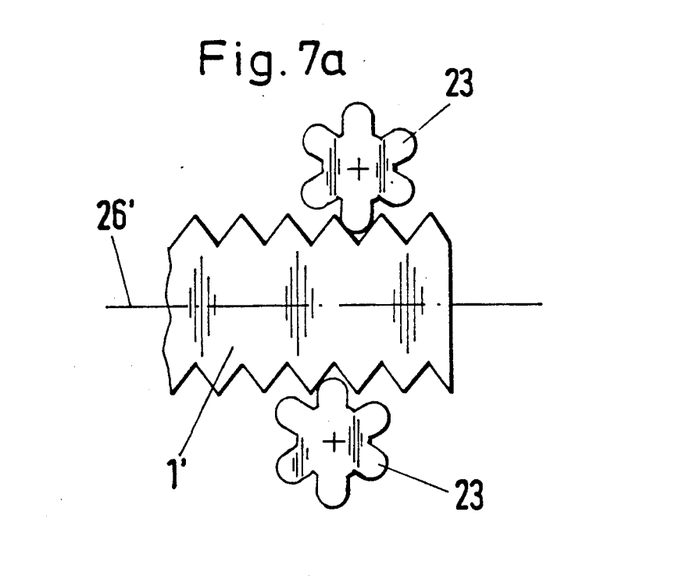

That which applies to the previously described embodiment also substantially applies in this case except that the test object 1' does not rotate about its axis during the testing or measuring process, but is shifted in a translational movement in the direction of the arrow 36 relative to the roller wheel.

FIG. 7a shows that it is also possible to use two roller wheels 23 when the test object 1' is in the form of a threaded bold or the like. This is advantageous when there is a risk that the longitudinal mid axis 26' of the test object is not exactly parallel to the direction of displacement of the test object or, as the drawings show, to the direction of displacement of the roller wheel.

Figure 8A:
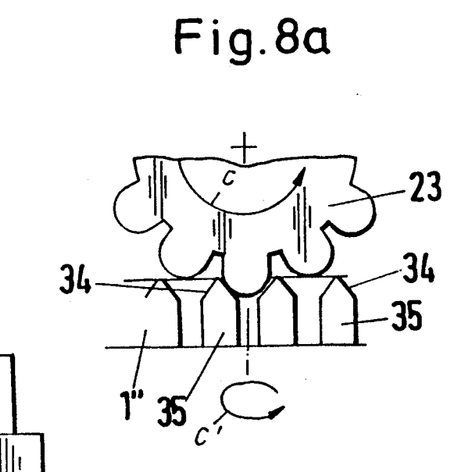
FIG. 8a is a partial view as seen in the direction of arrow A in FIG. 8.

FIG. 8 shows an arrangement for measuring any defects in so-called top-bevels 34 of teeth 35 of an appropriate test object wheel 1". In general the reference numbering used in FIG. 6 applies here. FIG. 8a shows, as seen in the direction of the arrow A in FIG. 8, the test object 1" with teeth 35 and the top-bevels 34 of these teeth which are necessary, for example, in the case of gear wheels. The roller wheel 23 is also shown.

It is also possible to provide the embodiment shown in FIGS. 8 and 8a, as in the case of the embodiment in FIG. 6, with an arrangement for measuring defects in spacing, e.g. corresponding to the bar-code rotational position indicator 24 with the associated bar-code reader 34 shown in FIG. 6. However, in order to simplify the drawings in FIGS. 7 and 8 this is not shown.

What is claimed is:

1. A method for detecting faults and inaccuracies in a test object which is splined wheel having an axis of rotation and substantially uniformly shaped teeth, comprising the steps of:
   providing a testing device with a toothed test wheel having an axis of rotation;
   providing the test device with a plurality of gauging elements which are introducible into spaces between adjacent teeth of the test object, each gauging element having a curved testing cross-section adapted for engaging in the spaces between the test object teeth;
   alternately inserting only one testing cross-section, then two testing cross-sections, and again only one testing cross-section, in the spaces between the test object teeth;
   measuring and recording differences between a depth of insertion when only one testing cross-section is inserted and when two testing cross-sections are inserted by determining a corresponding change in a distance between the axes of rotation of the test wheel and the test object; and
   providing the roller wheel with a number of testing cross-sections and rotating the test wheel so as to continuously perform the above inserting, measuring and testing.

2. A method as defined in claim 1, wherein the radius selecting step includes selecting a radius of the curved testing cross-section which is an arc of a circle.

3. A method as defined in claim 1, wherein said measuring and recording step includes measuring and recording faults determined by the change in distance between a longitudinal midline of an axle of the test wheel and an axle of the test object, as a result of at least one of a relative displacement between the test wheel and the test object and a known measurement over two pins procedure.

4. A method as defined in claim 3, wherein said measuring and recording step includes measuring and recording faults or inaccuracies in one of toothed spacing or pitch of the test object.

5. A method as defined in claim 4, wherein said measuring and recording step includes combining the recording of faults or inaccuracies measured by at least one of the distance between two axes and the measurement over two pins procedure and the recording of faults or inaccuracies in toothed spacing, into a combined recording.

6. A testing device for detecting faults and inaccuracies in a test object which is a splined wheel having substantially uniformly shaped teeth, comprising:
   a toothed test wheel having an axis of rotation; and
   a plurality of gauging elements introducible into spaces between adjacent teeth of the test object, each gauging element having a testing cross-section which is adapted to be engageable in the spaces between the teeth of the test object and which is curved, the testing cross-section of the gauging elements having a radius selected relative to structure and shape of the test object teeth so that when the gauging element is introduced into the space between adjacent teeth the testing cross-section rests on flanks of the adjacent teeth of the test object at points between the top and bottom of said adjacent teeth, and so that only one testing cross-section then two testing cross-sections are alternately introduced in the spaces between the test object teeth, the test object and the test wheel being displaceable relative to one another in a measurement direction, and the testing cross-section having a shape selected so as to allow no more than two testing cross-sections to engage in the spaces between the test object teeth so that when only one testing cross-section is engaged there is a greater distance between the axes of the test wheel and the test object than when two testing sections are engaged, a number of the testing cross-sections of the gauging elements being arranged circumferentially in a ring so as to have a spacing from one another in a circumferential direction which corresponds to the spacing of the test object teeth, the testing cross-sections projecting radially outward from this ring, the test wheel and the test object being rotatable in opposite directions to one another so that contact surfaces of the test object and the flanks of the teeth slide over each other.

7. A testing device as defined in claim 6, wherein the testing cross-section is an arc of a circle.

8. A testing device as defined in claim 6, wherein the test wheel and the gauging elements are formed in a single piece.

9. A testing device as defined in claim 8, wherein the test wheel is provided with projections arranged so as to project radially outward from the test wheel, the testing cross-sections being formed as part of the projections, the projections having gaps therebetween into which tops of the teeth of the test object are insertable.

10. A testing device as defined in claim 6, and further comprising pressing means for pressing together the test object and the test wheel, and measuring means for measuring the distance between the axis of the test object and the axis of the roller wheel.

11. A testing device as defined in claim 10, wherein the pressing means includes a spring.

12. A testing device as defined in claim 6, wherein the test wheel and the test object each have a shaft, and further comprising a testing device frame, a shaft bearing for the test wheel shaft, and a shaft bearing for the test object shaft, one of the shaft bearings being fixed and the other of the shaft bearings being movably attached to the frame, and still further comprising first measuring means for measuring movement of the other shaft bearing relative to the frame.

13. A testing device as defined in claim 12, wherein one of the test wheel shaft and the test object shaft have a calibration provided so as to extend in a rotational direction, and further comprising second measuring means for measuring rotational position by using the calibration.

14. A testing device as defined in claim 13, wherein the first and the second measuring means are coupled together so as to combine recordings therefrom.

15. A testing device as defined in claim 6, wherein the axis of the test wheel and the axis of the test object are arranged so as to be parallel to one another.

16. A testing device as defined in claim 6, wherein the axis of the test wheel and the axis of the test object are arranged so as to be at an angle to one another.

17. A testing device as defined in claim 6, wherein the test object is a threaded member, the test wheel being engageable in a longitudinal direction in the threads of the test object.

18. A testing device as defined in claim 17, and further comprising an additional test wheel, both said test wheels being engageable in the longitudinal direction in the test object threads.

19. A testing device as defined in claim 6, wherein the test object is a master reference object.

* * * * *